E. H. CASSEL.
DEVICE FOR OILING AXLE SPINDLES WITH HARD OIL.
APPLICATION FILED JUNE 25, 1917.

1,267,628.

Patented May 28, 1918.

Inventor
Edmund H. Cassel

UNITED STATES PATENT OFFICE.

EDMUND H. CASSEL, OF MADRID, IOWA.

DEVICE FOR OILING AXLE-SPINDLES WITH HARD OIL.

1,267,628.  Specification of Letters Patent.  Patented May 28, 1918.

Application filed June 25, 1917. Serial No. 176,890.

*To all whom it may concern:*

Be it known that I, EDMUND H. CASSEL, a citizen of the United States, and resident of Madrid, in the county of Boone and State of Iowa, have invented a certain new and useful Device for Oiling Axle-Spindles with Hard Oil, of which the following is a specification.

The object of my invention is to provide a simple, durable and inexpensive device for oiling axle spindles with hard oil for maintaining a continuous and uniform distribution of the oil over part of the spindle which endures the greatest friction.

Still a further object is to provide such a device which will thoroughly oil the spindle at the end carrying the nut.

With these and other objects in view, my invention consists in the construction, arrangement and combination of the various parts of the device, whereby the objects contemplated are attained, as hereinafter more fully set forth, pointed out in my claims, and illustrated in the accompanying drawings, in which:

Figure 2:
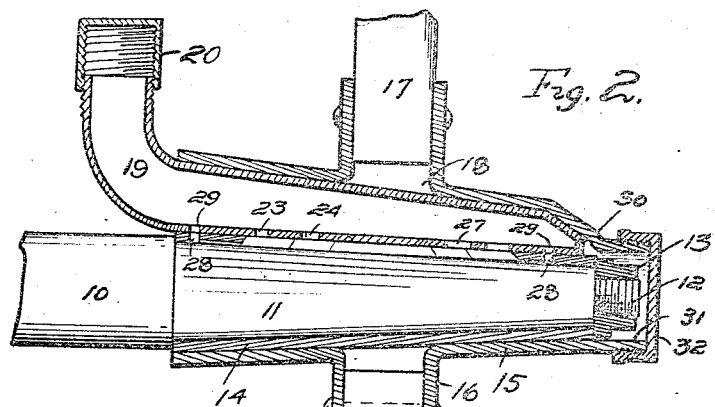
Fig. 2 shows a transverse, vertical, sectional view of the same.
Figure 1:
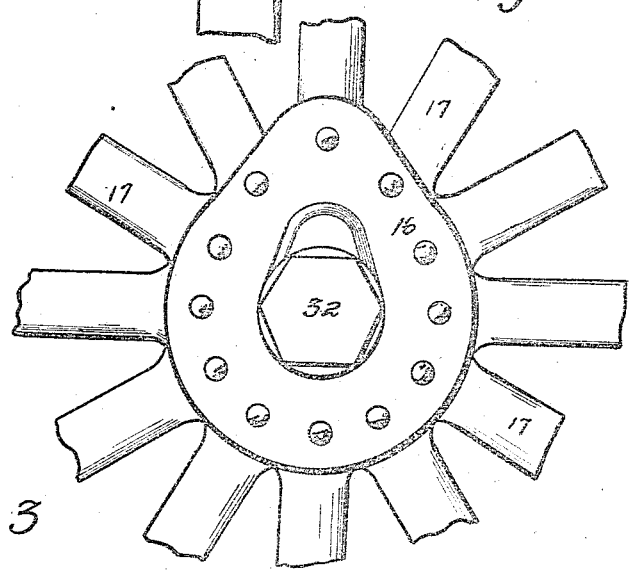
Figure 1 shows a side elevation of a hub and part of the spokes of a vehicle wheel, equipped with an oiling device embodying my invention.
Figure 3:
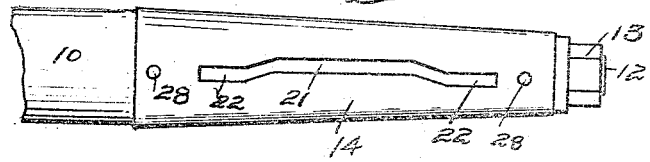
Fig. 3 shows a top or plan view of the spindle with the sleeve which forms the inner part of the hub mounted thereon, illustrating the peculiar shape of the slot in the sleeve.

In the form of my invention illustrated in the accompanying drawings, I have used the reference numeral 10 to indicate generally the axle of a vehicle having at one end the tapered spindle 11. The spindle 11 is provided at its free end with a reduced cylindrical, externally screw-threaded extension 12 to receive the nut 13 which holds the wheel on the spindle.

I have shown a portion of a wheel having a hub formed with a central sleeve 14 which fits snugly on the spindle 11 and is tapered to correspond to the shape of the spindle.

Surrounding the sleeve 14 is a hub casing member 15 having the flanges 16 for the inner ends of the spokes 17.

The hub casing 15 is provided with a compartment or enlarged portion 18 designed to receive an oil tube 19. The compartment 18 and the portion of the oil tube 19 received therein are preferably tapered somewhat from end to end.

The oil tube 19 projects laterally and thence radially outwardly from the larger end of the compartment 18 and has on its outer end a grease cup 20, shown in Fig. 2.

The sleeve 14 is provided with a longitudinal slot 21 having at its ends portions 22 offset circumferentially of the sleeve 14 from the body of said slot.

The purpose of the peculiar configuration of the slot 22 is to avoid a long, longitudinally arranged slot which would weaken the sleeve as a bearing for receiving the spindle 11, and to avoid leaving a considerable area in one longitudinal section of the sleeve which has no solid metal bearing against the spindle 11.

The grease tube 19 is provided with a plurality of openings 23, 24, and 27 which register with the slot 21 and the portions 22 thereof, which openings gradually increase in size from the opening 22 to the opening 27 so that the large openings are the ones farthest removed from the grease cup. No openings are provided near the longitudinal center of the axle since grease tends to collect there in any event.

Near the inner and outer ends of the spindle the sleeve 14 is provided with openings 28 which register with similar openings 29 in the tube 19.

At the outer end of the tube 19 is an opening 30 through which oil may pass to the nut 13.

It will thus be seen that the arrangement of my improved oiling device is such as to supply oil to the ends of the spindle. In this connection it should be mentioned that the ends of the spindle are the parts which become dry first.

Formed on the casing 15 is a cylindrical, lateral extension 31, externally screw-threaded to receive the cap 32.

The device may be made with or without the cap 32, but when the cap 32 is used, it will be obvious that an oil space is provided which will make it possible for the outer end of the spindle and the nut 13 to travel in oil.

The advantages of a device of the kind herein described, may be largely seen from the foregoing description.

It will be obvious that the arrangement of the oil passages and openings is such as to afford an ample supply of oil to parts of the spindle 13, as long as there is oil in the tube 19.

It is a simple problem to supply new oil to a device of this kind, for the reason that the cup 20 may be removed and oil may be forced into the tube 19 and the cup 20 may be filled, and as the cup 20 is screwed on to the tube 19, the hard oil will be forced in the recesses of the tube 19.

The peculiar arrangement of the slot 21 is such as to avoid a long, straight slot in the sleeve 14, which might weaken such sleeve and impair its efficiency as a bearing, and yet on account of the fact that the slot 21 is of considerable length, it is obvious that it may be entirely filled with oil through the various openings 23 to 27 inclusive, so that it will afford an ample supply of oil to the entire central portion of the spindle 11.

The outer end of the spindle and the nut thereon may be run in oil where the extension 31 and cap 32 are employed.

Some changes may be made in the construction, arrangement and combination of the various parts of my improved device, without departing from the real spirit and purposes of my invention, and it is my intention to cover by the patent to be issued on my application, any such modified forms of structure or use of mechanical equivalents, which may be reasonably included within the scope of my claims.

I claim as my invention:

1. In a device of the class described, the combination of a spindle with a vehicle hub comprising a sleeve mounted on said spindle, a hub casing mounted on said sleeve having in one portion a compartment, an oil tube received within said compartment having a portion extending away from said compartment, an oil cup on said last portion, said tube being tapered from its end adjacent to the oil cup toward its other end, said sleeve being provided with a longitudinal slot having portions offset from other portions circumferentially of the sleeve, said tube having holes extending through it registering with said slot, said casing having an extension, and a cap on said extension.

2. In a device of the class described, the combination of a spindle with a sleeve thereon, having a slot extending through it, provided with a portion offset circumferentially of the sleeve from another portion, a hub casing receiving said sleeve, and having a compartment for an oil tube, an oil tube received in said compartment and extending away therefrom, a cup on said oil tube, said tube being provided with graduated openings registering with said slot, said openings being gradually larger in size as they are farther from said cup, said tube having at its end farthest from said cup a horizontal passage designed to be adjacent to the outer end of the spindle.

3. In a device of the class described, the combination of a spindle with a sleeve thereon, having a slot extending through it, provided with a portion offset circumferentially of the sleeve from another portion, a hub casing receiving said sleeve, and having a compartment for an oil tube, an oil tube received in said compartment and extending away therefrom, a cup on said oil tube, said tube being provided with graduated openings registering with said slot, said openings being gradually larger in size as they are farther from said cup.

4. In a device of the class described, the combination of a spindle with a sleeve thereon, having a slot extending through it, provided with a portion offset circumferentially of the sleeve from another portion, a hub casing receiving said sleeve, and having a compartment for an oil tube, an oil tube received in said compartment and extending away therefrom, a cup on said oil tube, said tube being provided with graduated openings registering with said slot, said openings being gradually larger in size as they are farther from said cup, an extension on the outer end of said casing, and a cap on said extension.

Des Moines, Iowa, June 9, 1917.

EDMUND H. CASSEL.